(12) United States Patent
Wang

(10) Patent No.: US 11,787,521 B2
(45) Date of Patent: Oct. 17, 2023

(54) UNDERWATER THRUSTER

(71) Applicant: ORIENTAL RECREATIONAL PRODUCTS (SHANGHAI) CO., LTD, Shanghai (CN)

(72) Inventor: Zhiyue Wang, Shanghai (CN)

(73) Assignee: ORIENTAL RECREATIONAL PRODUCTS (SHANGHAI) CO., LTD, Shanghai (CN)

(*) Notice: Subject to any disclaimer, the term of this patent is extended or adjusted under 35 U.S.C. 154(b) by 273 days.

(21) Appl. No.: 17/288,266

(22) PCT Filed: Jun. 20, 2019

(86) PCT No.: PCT/CN2019/092062
§ 371 (c)(1),
(2) Date: Apr. 23, 2021

(87) PCT Pub. No.: WO2020/082765
PCT Pub. Date: Apr. 30, 2020

(65) Prior Publication Data
US 2021/0380211 A1 Dec. 9, 2021

(30) Foreign Application Priority Data
Oct. 23, 2018 (CN) .......................... 201811236217.7

(51) Int. Cl.
B63H 11/08 (2006.01)
B60L 50/60 (2019.01)
B60L 15/20 (2006.01)
B63H 1/14 (2006.01)
B63H 21/21 (2006.01)

(52) U.S. Cl.
CPC .............. *B63H 11/08* (2013.01); *B60L 15/20* (2013.01); *B60L 50/60* (2019.02); *B63H 1/14* (2013.01); *B63H 21/21* (2013.01)

(58) Field of Classification Search
CPC .......... B63H 11/08; B63H 1/14; B63H 21/21; B60L 50/60; B60L 15/20
See application file for complete search history.

(56) References Cited

U.S. PATENT DOCUMENTS

2002/0170763 A1* 11/2002 Townsend ............... B60L 15/20
180/220

FOREIGN PATENT DOCUMENTS

| CN | 201016028 A | 2/2008 |
|---|---|---|
| CN | 203094426 A | 7/2013 |
| CN | 107776862 A | 3/2018 |
| CN | 108327883 A | 7/2018 |
| CN | 207725587 | 8/2018 |
| CN | 207725587 U * | 8/2018 |

(Continued)

*Primary Examiner* — Stephen P Avila
(74) *Attorney, Agent, or Firm* — Woods Oviatt Gilman LLP; Katherine H. McGuire, Esq.

(57) ABSTRACT

An underwater thruster with improved guide stability and increased kinetic energy utilization rate comprises a power part and a propeller, wherein the power part is provided upstream of the propeller for driving the propeller to rotate. The underwater thruster further comprises a diversion part which is provided between the water inlet part and the water outlet part and is connected with the water inlet part and the water outlet part respectively in a plug-in manner, to uniformly disperse water entering the water inlet part to blades of the propeller.

17 Claims, 5 Drawing Sheets

(56) References Cited

FOREIGN PATENT DOCUMENTS

| | | | | |
|---|---|---|---|---|
| CN | 2018168664 A | 9/2018 | | |
| CN | 207945129 A | 10/2018 | | |
| EP | 1600369 | * 11/2005 | ............. | B63C 11/46 |
| FR | 1298703 A | * 7/1961 | | |

* cited by examiner

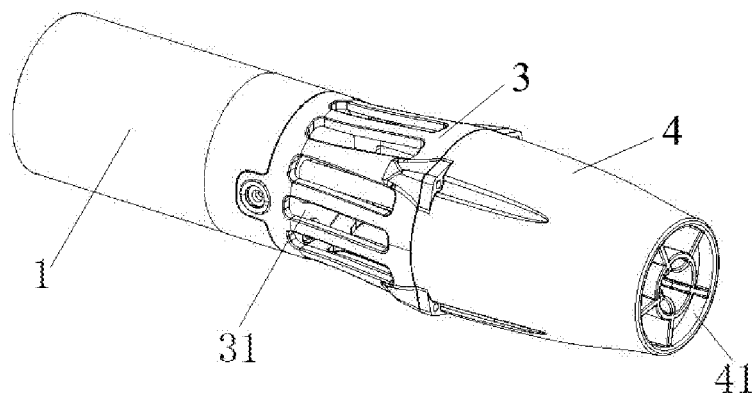
Fig. 3
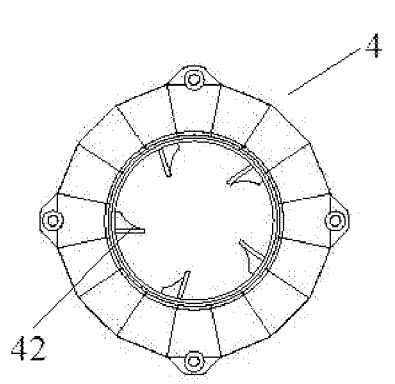 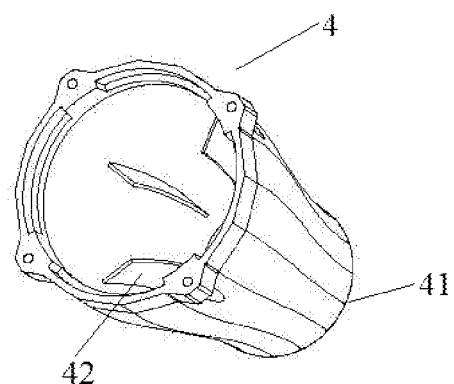
Fig. 4a　　　　　　　　　　　Fig. 4b
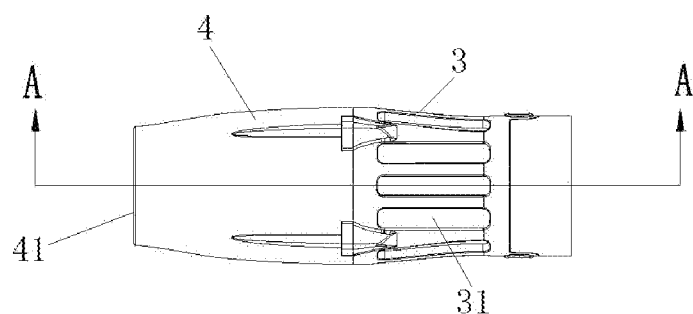
Fig. 4c

UNDERWATER THRUSTER

FIELD OF THE INVENTION

The present disclosure relates to the field of water sports equipment, in particular to an underwater thruster.

BACKGROUND OF THE INVENTION

Underwater thrusters, also known as frogman thrusters, are one of important assisting means for frogmen or swimming enthusiasts in shallow water diving, and are increasingly favored by users abroad. An underwater thruster includes a storage battery, a controller, a driving motor and a transmission device. The controller controls the power supply to be turned on. The storage battery supplies power to the driving motor. The driving motor drives a propeller through the transmission device, and the propeller rotates to push the underwater thruster to advance.

Chinese patent CN107472484A discloses an underwater thruster including an impeller, a housing, an inner cavity and a driving device, wherein the housing is cylindrical, a lower end of the housing being of a streamlined structure which has two ends communicated with each other and is hollow inside, elongate water inlets being formed at the outer side of the lower end of the housing, and the impeller being provided inside the housing near a water outlet at the bottom; the driving device is provided in the inner cavity, and a driving shaft of the driving device extends out of the inner cavity and is fixedly connected to the impeller; and a fixing means is further provided on a side of the housing. The patent has an integrated design in which a propeller is hidden in a pipe to avoid a risk of injury to some degree, and the user can carry around the thruster and use it at any time. The underwater thruster in the existing art has a poor guiding effect when in use, and is limited in the kinetic energy utilization rate.

SUMMARY OF THE INVENTION

A problem to be solved by the present disclosure is to improve the guide stability of the underwater thruster in use and increase the kinetic energy utilization rate by improving the structure of the underwater thruster.

To solve the above problem, the present disclosure provides an underwater thruster including a power part and a propeller, wherein the power part is provided at the upstream of the propeller to drive the propeller to rotate, the underwater thruster further comprising:

a water inlet part, which the power part is provided at the upstream or internally of the water inlet part, the water inlet part being provided with a water inlet, one end and the other end of the water inlet part being columnar, and the diameters of radial cross-sections of the water inlet part gradually increasing from the one end to the other end of the water inlet part; and a water outlet part, which is provided at the downstream of the water inlet part, one end of the water outlet part being provided with a water outlet, wherein the water inlet part is adjacent to the propeller and provided at the upstream of the propeller, and the propeller is provided inside the water outlet part.

Optionally, the underwater thruster further comprising a diversion part, which is provided between the water inlet part and the water outlet part and is connected with the water inlet part and the water outlet part respectively in a plug-in manner, to uniformly disperse water entering the water inlet part to blades of the propeller, the diversion part comprising:

a diversion shell;
a central disc; and
a plurality of guide pieces, which are distributed circumferentially of the diversion shell, and connect the diversion shell and the central disc, with a guide channel being formed between two adjacent guide pieces.

Optionally, an included angle between the guide pieces and a central axis of the underwater thruster is in a range of 10-15°, and an opening direction of the included angle is same as a rotating direction of the blades of the propeller.

Optionally, the other end of the water outlet part is correspondingly connected with the other end of the water inlet part.

Optionally, the water inlet part extends from the one end to the other end of the water inlet part in an arc or straight line along a central axis direction of the underwater thruster.

Optionally, the propeller is provided between the water inlet and the water outlet, and the power part is configured to drive the propeller to rotate, to discharge water in the water inlet part through the water outlet and at the same time suck water from the water inlet.

Optionally, a plurality of grilles are provided inside the water outlet part to guide high-speed rotating water into a straight line.

Optionally, the water inlet is elongate or elliptical.

Optionally, an extending direction of the water inlet is parallel to or at an included angle with respect to a central axis of the underwater thruster.

Optionally, the water outlet part is connected with the water inlet part by 1 screwing screws into screw holes.

Optionally, the diameters of radial cross-sections of the water outlet part gradually decrease from the other end to the one end of the water outlet part.

Optionally, the ratio of the diameter of the radial cross-section of the other end of the water outlet part to the diameter of the radial cross-section of the one end of the water outlet part is in a range of 1-3.

Optionally, the power part is provided inside the water inlet part, an electronic speed regulator is provided at the upstream of the power part, and a battery is provided at the upstream of the electronic speed regulator.

Optionally, the underwater thruster further comprising:
a controller, which is provided at the upstream of the battery to control the on and off of the power part.

Optionally, a housing is correspondingly provided outside the battery and the controller to protect the battery and the controller, and the housing is sealed by a seal ring provided therebetween.

Optionally, a heat sink is provided between the electronic speed regulator and the housing to support the electronic speed regulator and dissipate heat generated by the electronic speed regulator; and a heat-conducting silicone grease is filled between the heat sink.

Optionally, an outer surface of the power part is provided with a heat-conducting layer to conduct and dissipate heat.

As described above, the present disclosure provides an underwater thruster, comprising a power part and a propeller, wherein the power part is provided at the upstream of the propeller to drive the propeller to rotate. The underwater thruster further comprising: a water inlet part, which the power part is provided at the upstream or internally of the water inlet part, the water inlet part being provided with a water inlet, one end and the other end of the water inlet part being columnar, and the diameters of radial cross-sections of the water inlet part gradually increasing from one end to the other end of the water inlet part; and a water outlet part, which is provided at the downstream of the water inlet part, one end of the water outlet part being provided with a water outlet, wherein the water inlet part is adjacent to the propeller and provided at the upstream of the propeller, and the propeller is provided inside the water outlet part.

Thus, in the present disclosure, as diameters of radial cross-sections of the water inlet part gradually increase from one end toward the other end of the water inlet part, more water flows in different directions enter the water inlet part through the water inlet, and under the action of the propeller, water is discharged through the water outlet to generate a thrust force, thereby improving the guide stability of the underwater thruster in use, and the kinetic energy utilization rate, and effectively improving the user experience.

BRIEF DESCRIPTION OF THE DRAWINGS

FIG. 3 is a partial schematic view I of an underwater thruster provided in an embodiment of the present disclosure;

FIG. 4a is a schematic view I of a water outlet part of an underwater thruster provided in an embodiment of the present disclosure;

FIG. 4b is a schematic view II of a water outlet part of an underwater thruster provided in an embodiment of the present invention;

FIG. 4c is a partial schematic view II of an underwater thruster provided in an embodiment of the present disclosure;

The above drawings include the following reference signs:

1 power part; 2 propeller; 21 blade; 3 water inlet part; 31 water inlet; 4 water outlet part; 41 water outlet; 42 grille; 5 electronic speed regulator; 6 battery; 7 controller; 8 housing; 81 seal ring; α included angle; 9 charging interface; 10 diversion part; 10' axis of diversion part; 11 plug-in part; 13 one end of diversion part; 14 the other end of diversion part; 15 central disc; 16 guide piece; 16' guide channel; 17 diversion shell; 18 heat sink; 19 heat-conducting silicone grease.

DETAILED DESCRIPTION OF THE EMBODIMENTS

Implementations of the present disclosure will be described below with specific embodiments, and other advantages and effects of the present disclosure can be easily understood by those skilled in the art from the disclosure in the specification. Although the description of the present disclosure will be introduced in conjunction with preferred embodiments, it does not mean that features of the present disclosure are limited to the implementations. On the contrary, the purpose of introducing the present disclosure in conjunction with the implementations is to cover other options or modifications that may be obtained by extensions based on the claims of the present disclosure. To provide in-depth understanding of the present disclosure, the following description will include many specific details. The present disclosure may also be implemented without using these details. In addition, to avoid confusion or obscuring the focus of the present disclosure, some specific details will be omitted in the description. It is to be noted that embodiments in the present disclosure and features in the embodiments may be combined with each other without conflicts.

Figure 1A:
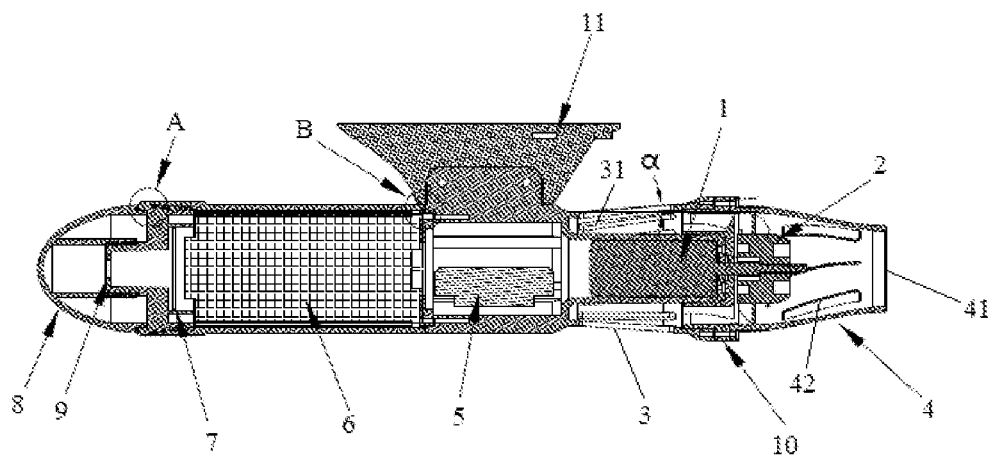
FIG. 1a is a sectional view I of an underwater thruster provided in an embodiment of the present disclosure.

The present disclosure uses an advancing direction of an underwater thruster as upstream. As shown in FIG. 1a, an embodiment of the present disclosure provides an underwater thruster, comprising a power part 1 and a propeller 2, wherein the power part 1 is provided at the upstream of the propeller 2 to drive the propeller 2 to rotate. The underwater thruster further comprising: a water inlet part 3, which the power part 1 is provided at the upstream or internally of the water inlet part 3, the water inlet part 3 being provided with a water inlet 31, one end and the other end of the water inlet part 3 being columnar, and the diameter of radial cross-sections of the water inlet part 3 gradually increasing from one end to the other end of the water inlet part 3; and a water outlet part 4, the water outlet part 4 is provided at the downstream of the water inlet part 3, one end of the water outlet part 4 is provided with a water outlet 41, wherein the water inlet part 3 is adjacent to the propeller 2 and provided at the upstream of the propeller 2, and the propeller 2 is provided inside the water outlet part 4. In the embodiment of the present disclosure, as diameters of radial cross-sections of the water inlet part gradually increase from one end toward the other end of the water inlet part, more water flows in different directions enter the water inlet part through the water inlet, and under the action of the propeller, water is discharged through the water outlet to generate a thrust force, thereby improving the guide stability of the underwater thruster in use, and the kinetic energy utilization rate, and effectively improving the user experience.

Figure 2A:
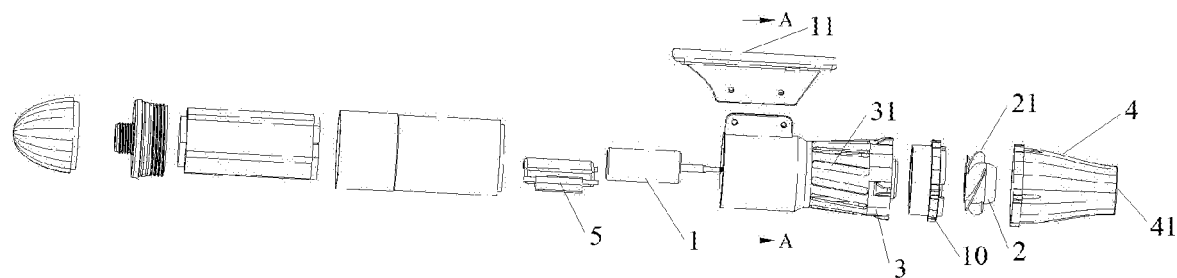
FIG. 2a is an exploded view of an underwater thruster provided in an embodiment of the present disclosure.
Figure 2B:
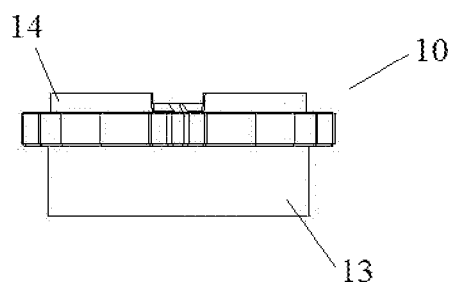
FIG. 2b is a schematic view I of a diversion part of an underwater thruster provided in an embodiment of the present disclosure.

An underwater thruster provided in an embodiment of the present disclosure, as shown in FIG. 2a, further comprising a diversion part 10, which is provided between the water inlet part 3 and the water outlet part 4 and is connected with the water inlet part 3 and the water outlet part 4 respectively in a plug-in manner, to uniformly disperse water entering the water inlet part 3 to blades 21 of the propeller 2. Specifically, as shown in FIGS. 2b and 2d, and referring to FIG. 2a, the other end of the water inlet part 3 is plugged to one end 13 of the diversion part, and the other end of the water outlet part 4 is plugged to the other end 14 of the diversion part to further improve the leakproofness between the water inlet part 3 and the water outlet part 4.

Figure 2C:
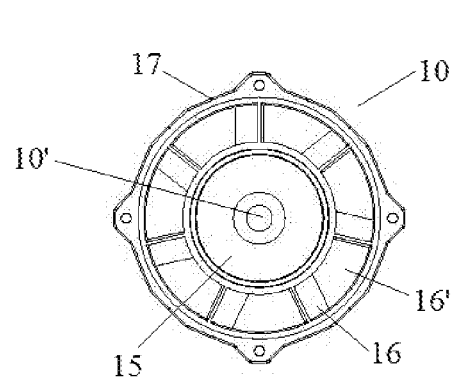
FIG. 2c is a schematic view II of a diversion part of an underwater thruster provided in an embodiment of the present disclosure.
Figure 2D:
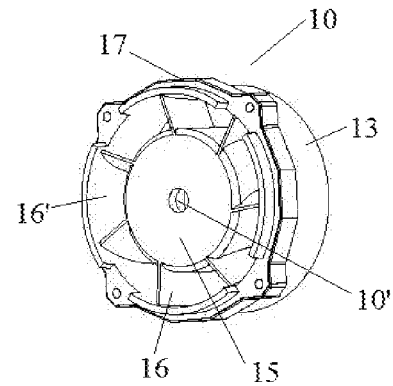
FIG. 2d is a schematic view III of a diversion part of an underwater thruster provided in an embodiment of the present disclosure.

In an underwater thruster provided in an embodiment of the present disclosure, as shown in FIGS. 2c and 2d, the diversion part 10 includes: a diversion shell 17; a central disc 15; and a plurality of guide pieces 16, wherein the guide pieces 16 are distributed circumferentially of the diversion shell 17, and connect the diversion shell 17 and the central disc 15, with a guide channel 16' being formed between every two adjacent guide pieces. An included angle between the guide pieces 16 and a central axis of the underwater thruster is in a range of 10-15°, and an opening direction of the included angle is same as a rotating direction of the blades 21 of the propeller 2, so that the water entering the water inlet part 3 is uniformly distributed to the blades 21 of the propeller 2 through the guide channels 16'.

In an underwater thruster provided in another embodiment of the present disclosure, as shown in FIG. 3, the other end of the water outlet part 4 is correspondingly connected with the other end of the water inlet part 3, wherein the other end of the water outlet part 4 and the other end of the water inlet part 3 have same port cross-sections, and both are columnar, so that after they are connected, a water flow can be effectively prevented from flowing out from the connection therebetween.

In an underwater thruster provided in another embodiment of the present disclosure, as shown in FIG. 3, the other end of the water outlet part 4 is connected with the other end of the water inlet part 3 by screwing screws into screw holes. FIG. 4a is a front view of the underwater thruster of another embodiment of the present disclosure; and FIG. 4b is a sectional view in a direction A of FIG. 4a of the underwater thruster of another embodiment of the present disclosure. The connection by means of the screw holes and the screws in an axial direction of the water outlet part 4 and the water inlet part 3 further strengthens the connectivity between the water outlet part 4 and the water inlet part 3 and prevents the water flow from flowing out from the connection therebetween. Optionally, an outer edge of the other end of the water outlet part 4 may be provided with a thread, and an inner edge of the other end of the water inlet part 3 is provided with a thread, and the threads are matched to achieved connection, but embodiments of the present disclosure are not limited thereto.

In an underwater thruster provided in another embodiment of the present disclosure, as shown in FIG. 3, the water inlet part 3 extends from the one end to the other end of the water inlet part 3 in an arc or straight line along the axial direction. In other words, while diameters of radial cross-sections of the water inlet part 3 gradually increase from the one end to the other end of the water inlet part 3, the water inlet part extends in an arc or straight line, so that when the underwater thruster advances underwater, the resistance during advance is effectively reduced.

In an underwater thruster provided in an embodiment of the present disclosure, as shown in FIG. 2a, the propeller 2 is provided between the water inlet 31 and the water outlet 41, and the power part 1 such as a motor drives the propeller 2 to rotate, to discharge water in the water inlet part 3 through the water outlet 41 and at the same time suck water from the water inlet 31. Compared with the existing art in which a propeller is provided at the bottom of an underwater thruster and exposed to the water, the embodiment of the present disclosure provides the propeller 2 between the water inlet 31 and the water outlet 41, which effectively reduces a potential risk of injury of a user.

In an underwater thruster provided in an embodiment of the present disclosure, as shown in FIGS. 4a to 4d, a plurality of grilles 42 are provided inside the water outlet part 4 to guide high-speed rotating water into a straight line, so that water flows to the water outlet 41 are concentrated to generate a great thrust force.

Figure 5A:
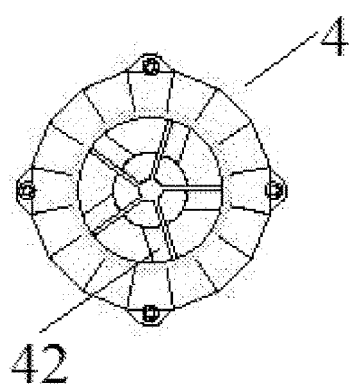
FIG. 5a is a schematic view III of a water outlet part of an underwater thruster provided in an embodiment of the present disclosure.
Figure 5B:
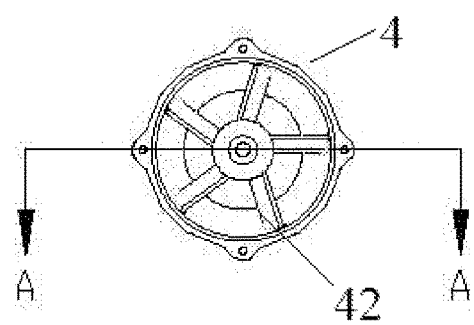
FIG. 5b is a schematic view IV of a water outlet part of an underwater thruster provided in an embodiment of the present disclosure.
Figure 5C:
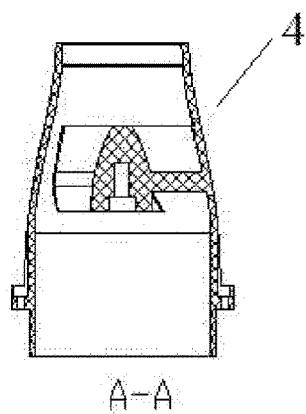
FIG. 5c is a sectional view of FIG. 5b along a direction A.
Figure 5D:
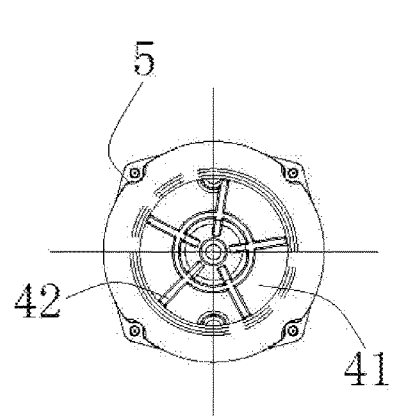
FIG. 5d is a schematic view V of a water outlet part of an underwater thruster provided in an embodiment of the present disclosure.

In an underwater thruster provided in another embodiment of the present disclosure, as shown in FIGS. 5a to 5c, a plurality of grilles 42 are provided inside the water outlet part 4 to guide high-speed rotating water into a straight line. A central disc is further provided inside the water outlet 4, and the grilles 42 are connected between the central disc and a shell of the water outlet part 4 to maximally guide the water rotated rapidly by the propeller 2 into a straight line, so that water flows to the water outlet 41 are concentrated to generate a great thrust force. Embodiments of the present disclosure are not limited thereto.

In an underwater thruster provided in an embodiment of the present disclosure, the water inlet 31 is elongate or elliptical, and a plurality of water inlets 31 are uniformly distributed circumferentially of the water inlet part 3, which is favorable for water flows in different directions to enter the water inlet part 3 through the water inlets 31. The shape of the water inlet 31 is not limited thereto.

Figure 4D:
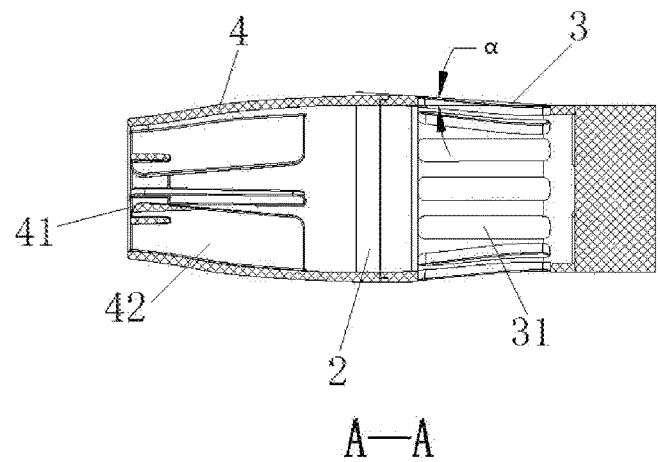
FIG. 4d is a sectional view of FIG. 4c along a direction A.

In an underwater thruster provided in an embodiment of the present disclosure, as shown in FIG. 4d, an extending direction of the water inlet 31 is parallel to or at an included angle with respect to the central axis of the underwater thruster, which may also be understood as that in the case where the water inlet part 3 extends from the one end to the other end of the water inlet part in an arc line in the axial direction, an included angle $\alpha$ is formed between a tangent line of the one end of the water inlet part 3 in the axial direction and a tangent line of the other end of the water inlet part 3 in the axial direction, and the included angle $\alpha$ is optionally 0-10°, so that water flows can enter the water inlets 31 from multiple angles during advance of the underwater thruster.

In an underwater thruster provided in another embodiment of the present disclosure, as shown in FIGS. 1a, 2a, 3, 4b, and 4d, diameters of radial cross-sections of the water outlet part 4 gradually decrease from the other end to the one end of the water outlet part 4, as shown in FIGS. 2a and 4b, which can extend in a streamline or curvature, and in combination with the arc extension of the water inlet part 3, the diameter of the radial cross-section where the connection between the water inlet part 3 and the water outlet part 4 is located is the largest, and in this case, the diameter of the radial cross-section of a port of the water outlet part 4 where the water outlet 41 is located is smaller than the diameter of the radial cross-section of the other port of the water outlet part 4, which is conducive to implementing that when water flows in different directions enter the water inlet part 3 through the water inlets 31, the rotation of the propeller 2 drives more water flows to the water outlet 41, so that water flows at the water outlet are concentrated with some intensity to generate a great thrust force. The ratio of the diameter of the radial cross-section of the other end of the water outlet part 4 to the diameter of the radial cross-section of the one end of the water outlet part 4 is in a range of 1-3.

In an underwater thruster provided in an embodiment of the present disclosure, as shown in FIG. 1a, the power part 1 is provided inside the water inlet part 3, an electronic speed regulator 5 is provided at the upstream of the power part 1, and a battery 6 is provided at the upstream of the electronic speed regulator 5. In the case where the power part 1 is a brushless motor, it needs to be connected to the battery 6 through the electronic speed regulator 5 to provide energy for the power part 3.

An underwater thruster provided in an embodiment of the present disclosure, as shown in FIG. 1a, further includes: a controller 7 such as a printed circuit board, the controller 7 being provided at the upstream of the battery 6 to control the on and off of the power part 1.

Figure 1B:
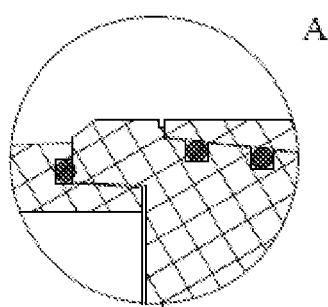
FIG. 1b is a partial enlarged view I of an underwater thruster provided in an embodiment of the present disclosure.
Figure 1C:
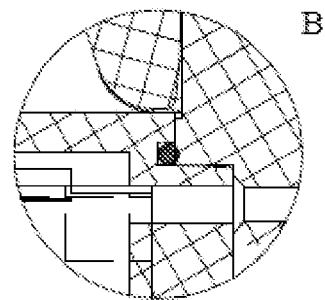
FIG. 1c is a partial enlarged view II of an underwater thruster provided in an embodiment of the present disclosure.
Figure 6:
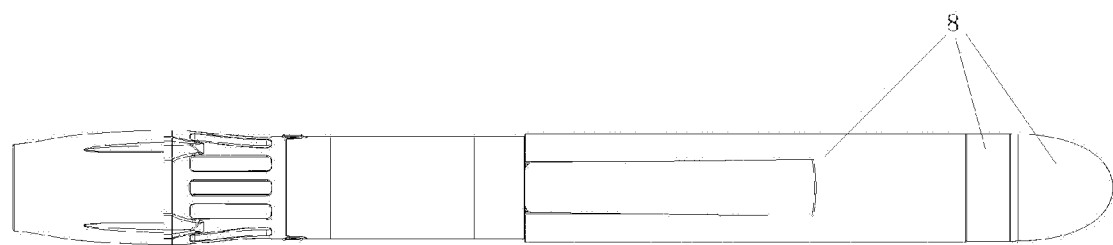
FIG. 6 is a three-dimensional view of an underwater thruster provided in another embodiment of the present disclosure.

In an underwater thruster provided in an embodiment of the present disclosure, as shown in FIG. 6, a housing 8 is correspondingly provided outside the battery 6 and the controller 7 to protect the battery 6 and the controller 7, and as shown in FIGS. 1b and 1c, the housing 7 is sealed by a seal ring 81 provided therebetween.

Figure 7:
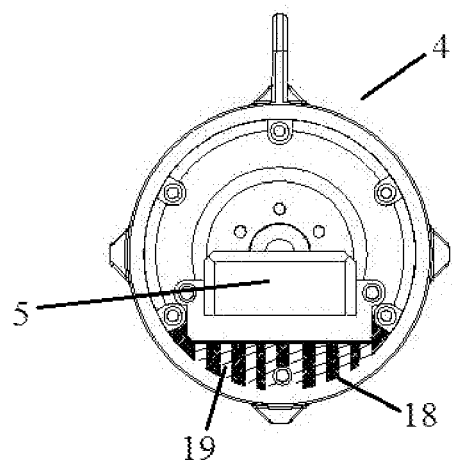
FIG. 7 is a view of FIG. 2a at a viewing angle along a direction A.

In an underwater thruster provided in an embodiment of the present disclosure, as shown in FIGS. 6 and 7, a heat sink 18 is provided between the electronic speed regulator 5 and the housing 8 to support the electronic speed regulator 5 and dissipate heat generated by the electronic speed regulator 5; and a heat-conducting silicone grease 19 (a shaded part) is filled between the heat sink 18 to further dissipate the heat generated by the electronic speed regulator 5.

In an underwater thruster provided in an embodiment of the present disclosure, an outer surface of the power part 1 is provided with a heat-conducting layer to conduct and dissipate heat generated by the power part 1. The underwater thruster has a waterproof function.

To sum up, in the underwater thruster provided by the present disclosure, when the controller 7 is turned on, the battery 6 provides electric energy to the power part 1, that is, the battery 6 provides electric energy to the power part 1 through the electronic speed regulator 5, and the power part 1 converts the electric energy into kinetic energy to drive a rotating shaft to rotate, and the rotating shaft drives the propeller 2 to rotate, so that water flows entering the water inlet part 3 through the water inlet 31 are introduced to the water outlet 41, and the plurality of grilles 42 are provided inside the water outlet part 4 to guide high-speed rotating water into a straight line, so that water flows to the water outlet 41 are concentrated to generate a great thrust force, which drives the underwater thruster to advance. As diameters of radial cross-sections of the water inlet part gradually increase from one end to the other end of the water inlet part, the underwater thruster sucks water straight ahead and laterally ahead of it during work, and more water flows in different directions enter the water inlet part through the water inlet to generate a forward pulling force, and under the action of the propeller, water is discharged through the water outlet to generate a thrust force, so that the kinetic energy of the product is more fully and effectively used, and the user experience is effectively improved.

In summary, the above embodiments provided in the present disclosure are merely illustrative of the principles of the present disclosure and effects thereof, and are not intended to limit the present disclosure. Any person skilled in the art can modify or change the above embodiments without departing from the spirit and scope of the present disclosure. Therefore, all equivalent modifications or changes made by those with ordinary knowledge in the technical field without departing from the spirit and technical ideas disclosed in the present disclosure are still covered by the claims of the present disclosure.

What is claimed is:

1. An underwater thruster, comprising a power part and a propeller, wherein the power part is provided at the upstream of the propeller to drive the propeller to rotate, the underwater thruster further comprising:
   a water inlet part, which the power part is provided at the upstream or internally of the water inlet part, the water inlet part being provided with a water inlet, one end and the other end of the water inlet part being columnar, and the diameter of radial cross-sections of the water inlet part gradually increasing from the one end to the other end of the water inlet part; and
   a water outlet part, which is provided at the downstream of the water inlet part, one end of the water outlet part being provided with a water outlet,
   wherein the water inlet part is adjacent to the propeller and provided at the upstream of the propeller, and the propeller is provided inside the water outlet part; and
   further comprising a diversion part, which is provided between the water inlet part and the water outlet part and is connected with the water inlet part and the water outlet part respectively in a plug-in manner, to uniformly disperse water entering the water inlet part to blades of the propeller, wherein the diversion part comprising:
   a diversion shell;
   a central disc; and
   a plurality of guide pieces, which are distributed circumferentially of the diversion shell, and connect the diversion shell and the central disc, with a guide channel being formed between two adjacent guide pieces.

2. The underwater thruster according to claim 1, wherein an included angle between the guide pieces and a central axis of the underwater thruster is in a range of 10-15°, and an opening direction of the included angle is same as a rotating direction of the blades of the propeller.

3. The underwater thruster according to claim 1, wherein the other end of the water outlet part is correspondingly connected with the other end of the water inlet part.

4. The underwater thruster according to claim 1, wherein the water inlet part extends from the one end to the other end of the water inlet part in an arc or straight line along a central axis direction of the underwater thruster.

5. The underwater thruster according to claim 1, wherein the propeller is provided between the water inlet and the water outlet, and the power part is configured to drive the propeller to rotate, to discharge water in the water inlet part through the water outlet and at the same time suck water from the water inlet.

6. The underwater thruster according to claim 1, wherein a plurality of grilles are provided inside the water outlet part to guide high-speed rotating water into a straight line.

7. The underwater thruster according to claim 1, wherein the water inlet is elongate or elliptical.

8. The underwater thruster according to claim 1, wherein an extending direction of the water inlet is parallel to or at an included angle with respect to a central axis of the underwater thruster.

9. The underwater thruster according to claim 3, wherein the water outlet part is connected with the water inlet part by screwing screws into screw holes.

10. The underwater thruster according to claim 1, wherein the diameter of radial cross-sections of the water outlet part gradually decrease from the other end to the one end of the water outlet part.

11. The underwater thruster according to claim 10, wherein the ratio of the diameter of the radial cross-section of the other end of the water outlet part to the diameter of the radial cross-section of the one end of the water outlet part is in a range of 1-3.

12. The underwater thruster according to claim 1, wherein the power part is provided inside the water inlet part, an electronic speed regulator is provided at the upstream of the power part, and a battery is provided at the upstream of the electronic speed regulator.

13. The underwater thruster according to claim 12, further comprising:
 a controller, which is provided at the upstream of the battery to control the on and off of the power part.

14. The underwater thruster according to claim 13, wherein a housing is correspondingly provided outside the battery and the controller to protect the battery and the controller, and the housing is sealed by a seal ring provided therebetween.

15. The underwater thruster according to claim 14, wherein a heat sink is provided between the electronic speed regulator and the housing to support the electronic speed regulator and dissipate heat generated by the electronic speed regulator; and a heat-conducting silicone grease is filled between the heat sink.

16. The underwater thruster according to claim 1, wherein an outer surface of the power part is provided with a heat-conducting layer to conduct and dissipate heat.

17. An underwater thruster, comprising a power part and a propeller, wherein the power part is provided at the upstream of the propeller to drive the propeller to rotate, the underwater thruster further comprising:

a water inlet part, which the power part is provided at the upstream or internally of the water inlet part, the water inlet part being provided with a water inlet, one end and the other end of the water inlet part being columnar, and the diameter of radial cross-sections of the water inlet part gradually increasing from the one end to the other end of the water inlet part; and a water outlet part, which is provided at the downstream of the water inlet part, one end of the water outlet part being provided with a water outlet, wherein the water inlet part is adjacent to the propeller and provided at the upstream of the propeller, and the propeller is provided inside the water outlet part, wherein the power part is provided inside the water inlet part, an electronic speed regulator is provided at the upstream of the power part, and a battery is provided at the upstream of the electronic speed regulator;

a controller, which is provided at the upstream of the battery to control the on and off of the power part;

wherein a housing is correspondingly provided outside the battery and the controller to protect the battery and the controller, and the housing is sealed by a seal ring provided therebetween;

wherein a heat sink is provided between the electronic speed regulator and the housing to support the electronic speed regulator and dissipate heat generated by the electronic speed regulator; and a heat-conducting silicone grease is filled between the heat sink.

\* \* \* \* \*